March 16, 1943.  J. McMENAMIN  2,313,761
COFFEE PERCOLATOR
Filed Feb. 17, 1940

INVENTOR.
JOSEPH McMENAMIN
BY Robb & Robb
ATTORNEYS

Patented Mar. 16, 1943

2,313,761

UNITED STATES PATENT OFFICE 2,313,761

COFFEE PERCOLATOR

Joseph McMenamin, Philadelphia, Pa.

Application February 17, 1940, Serial No. 319,551

11 Claims. (Cl. 53—3)

This invention relates to coffee percolators and, more particularly, to mechanism by which the coffee grounds may be quickly and efficiently removed from the percolator, after the percolator has been used to brew coffee.

In conventional types of percolators, hot water is forced upwardly through a liquid delivery tube and is permitted to percolate downwardly through coffee contained in a receptacle or basket supported by the liquid delivery tube. After the percolator has been used to brew coffee, the coffee grounds remaining in the receptacle are in a wet and sodden condition and usually packed into a substantially solid mass making the removal of the coffee grounds rather difficult. In order to 'loosen and remove grounds from the receptacle, it is frequently found necessary to jar and shake the basket or receptacle before the removal of the coffee grounds can be effected. In addition to the undesirable trouble incident to effecting the removal of the grounds, the force used in jarring and shaking the receptacle usually damages the percolator unit and will in the course of time render the unit unfit for further use.

The principal object of this invention is to provide a percolator unit which will permit the removal of used coffee grounds from the receptacle in a facile manner.

A further object is to provide an annular flange receptacle within the bottom of the coffee receptacle of the percolator unit with a handle member extending above the level of the receptacle by which the flange may be manually removed from the receptacle together with the coffee grounds therein.

A further object is to provide an annular flange of the character referred to which is contractable and expansible to thereby permit its adjustment to various positions for use in receptacles of different sizes.

A still further object is to provide a coffee receptacle which is slidably movable relative to the liquid delivery tube with an annular flange of the character referred to which is fixed with respect to the delivery tube thereby enabling the coffee grounds to be ejected from the coffee receptacle by causing sliding movement of the receptacle relative to the liquid delivery tube and the annular flange affixed thereto.

Other objects and advantages of the invention will become apparent during the course of the following description.

In the drawing there are shown several preferred embodiments of the invention. In this showing:

Figure 1:
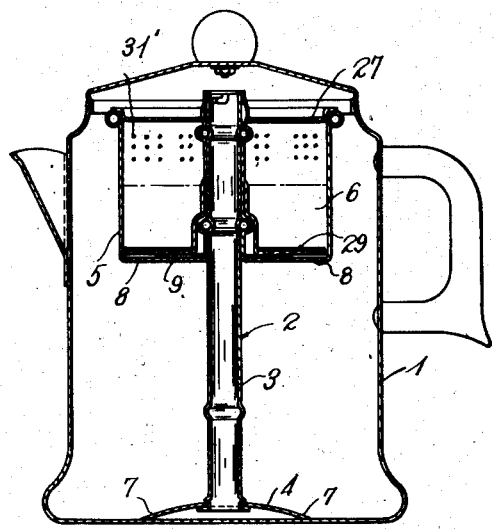
Figure 1 is a vertical sectional view of a coffee pot showing a percolator unit constructed in accordance with the principles of this invention mounted therein.

Referring to Figure 1, the numeral 1 indicates a coffee pot having a percolator unit, indicated as a whole by the numeral 2, mounted therein. The percolator unit comprises a liquid delivery tube 3 supported by a steam dome 4 resting on the bottom of the coffee pot 1. A receptacle or basket 5 is secured to the upper end of the liquid delivery tube 3 and provides an annular space 6 around the tube 3 for the reception of coffee grounds through which the liquid may percolate.

The parts thus far described comprise the conventional type of coffee percolating apparatus in which hot liquid may enter the steam dome 4 through openings 7 to be forced upwardly through the liquid delivery tube 3. The liquid on passing the upper end of the delivery tube 3 falls into the basket 5 and percolates through coffee grounds placed therein, and out of the bottom of the basket 5, the bottom of the basket being provided with a plurality of perforations 8 permitting the exit of the coffee therefrom.

After brewing coffee, the coffee grounds in the space 6 within the basket 5 will be in a substantially sodden solid mass. To remove the wet coffee grounds, the customary practise is to take the entire unit 2 out of the coffee pot 1 and loosen the coffee grounds by tapping the basket 5. The percolating units are of necessity made of comparatively light materials, and it will be apparent that pounding on the receptacle 5 will eventually cause damage to the percolating unit.

In some cases, the grounds are packed so solidly that it is necessary to dig the grounds out of the receptacle 5. Moreover, after the coffee grounds in the receptacle 5 have been loosened, cleaning of the percolator unit is rendered difficult by reason of the fact that some of the grounds tend to cling to the interior of the coffee receptacle or basket. Such grounds are usually removed by placing the receptacle under a water hydrant and using the force of the water to wash the clinging grounds from the receptacle thereby causing the grounds to be splashed all over the sink into which the water is flowing.

In order to provide an efficient and clean method of removing coffee grounds from the receptacle 5, the receptacle 5 is provided with an annular flange or ejector element 9 substantially covering the bottom 10 of the basket 5. A sleeve 11 surrounding the liquid delivery tube 3 is integrally secured to the inner edge 12 of the annular flange 9 and extends upwardly to a point adjacent the top of the liquid delivery tube 3. The sleeve 11 is removably positioned with respect to the tube 3 and is provided with an enlarged portion 12a formed at the upper end thereof providing a handle which may be grasped manually for imparting an upward movement to the sleeve 11 and flange 9. The basket 5 being secured to the tube 3, it will be apparent that the upward movement of the flange 9 will carry with it the coffee grounds remaining in the receptacle 5, after the percolator has been used to make coffee.

Since the flange 9 substantially covers the bottom of the basket 5, it will be apparent that the coffee grounds will be completely removed from the receptacle 5 by the removal of the flange 9.

Figure 4:
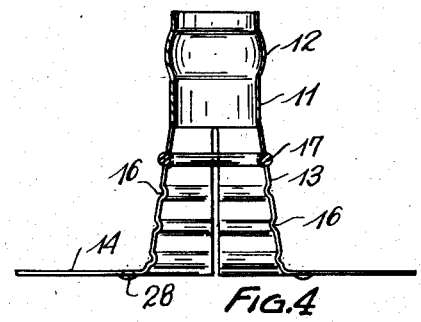
Figure 4 is a vertical sectional view of a modified form of a coffee grounds removing device adaptable for use in various types of coffee percolating units.
Figure 5:
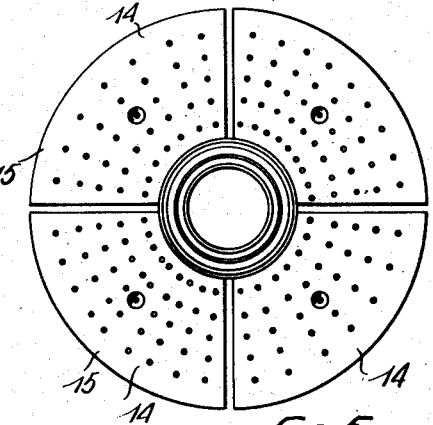
Figure 5 is a plan view of the device illustrated in Figure 4.

In Figures 4 and 5, there is illustrated a modified form of a contractable and expansible device for removing coffee grounds which is adjustable to different positions to fit various size coffee receptacles used in conventional type percolating units. In this construction, the sleeve 11 and projecting handle 12a is provided with a plurality of resilient members 13 angularly inclined outwardly with respect to the sleeve 11.

Each of the resilient members 13 is provided with sector-shaped lifting members 14 integrally secured to the lower edge thereof. As best shown in Figure 5, the combined sector-shaped members 14 provide a substantially annular lifting member similar to the unbroken annular flange 9.

The resilient members 13 and integral sectors 14 are spaced from each other to permit movement of the circular edges 15 inwardly from the position shown in Figures 4 and 5. The resilient members 13 are provided with a plurality of grooves 16 for the reception of an adjusting ring 17. By movement of the ring 17 in to different grooves 16, it will be apparent that the outer edges 15 of the sectors 14 may be adjusted to different positions for engagement with the side walls of various sized receptacles 5.

Returning to Figure 2, the basket 5 is provided with an integral sleeve 18 integrally secured to the bottom thereof and slidably engageable with the outer wall of the tube 3. A circular groove 19 is formed in the outer surface of the tube 3 and a corresponding groove 20 facing the groove 19 is formed on the inner face of the sleeve 18.

Figure 6:
Figure 6 is an illlustration of a spring clip used for releasably securing parts of the percolator unit to the liquid delivery tube.

A split resilient ring 21, illustrated in Figure 6, is adapted to lie partially in both the grooves 19 and 20 for releasably holding the basket 5 in a fixed position with respect to the tube 3. The flange 9 and integral annular sleeve may also be releasably secured to the tube 3 by a resilient locking ring 21, cooperating grooves 22 and 23 respectively similar to the grooves 19 and 20 being provided in the tube 3 and sleeve 11 for this purpose. A pin 24 may be provided on the sleeve 11 for engagement in an L-shaped slot 25 formed in the upper end of the tube 3 for positively locking the sleeve 11 in a fixed position with respect to the tube 3. In order to prevent movement of the sleeve 11 downwardly from the position shown in Figure 2, an abutment 26 may be formed at the upper end thereof for engagement with the upper end of the tube 3.

In order to properly control the flow of liquid through coffee grounds in the basket 5, a perforated top 27 is provided for the basket 5. The rate of flow of liquid into the basket 5 will be dependent upon the size of the perforations formed in the top 27.

The rate of flow or percolation will also be dependent to a certain extent upon the number and size of perforations in the bottom 10 of the basket 5 and in the annular flange 9. In order to permit free flow of liquid through the annular flange 9 and bottom 10, the annular flange 9 is provided with depending portions 28 providing legs spacing the flange 9 from the bottom of the basket. To prevent fine particles of coffee grounds from passing through the perforations in the flange 9 and bottom 10, an annular filter element 29 may be positioned on the upper surface by the flange 9. The opening in the annular filter element 29 must be of sufficient size to clear the handle 12a on the sleeve 11 and in order that the filter element will completely cover the flange 9, the sleeve 11 is enlarged as at 30 so as to abut against the edge of the opening in the filter element 29. The enlarged portion 30 of the sleeve 11 also serves as a means for properly centering the filter element with respect to the flange 9.

It will be apparent that the filter element 29 will also be effective to control the rate of flow of liquid through the receptacle 5. The filter element 29 is held in position against the flange 9 by the weight of the coffee and by a suction effect which is produced by the liquid flowing through the perforations in the annular flange 9.

Figure 3:
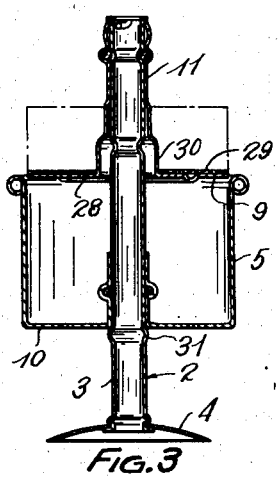
Figure 3 is a vertical sectional view of a percolator unit showing the relative positions of the parts after actuation to remove coffee grounds from the receptacle.
Figure 2:
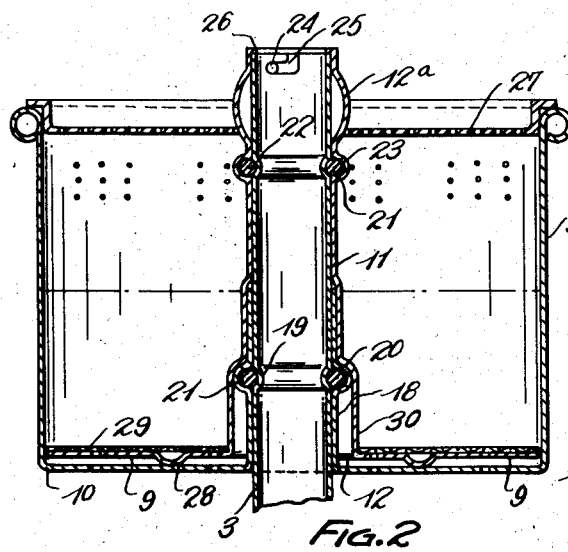
Figure 2 is an enlarged sectional view of the percolator unit shown in Figure 1, a part thereof being broken away.

In order to eject coffee grounds from the particular unit illustrated in Figure 2, the unit is removed from the pot 1 and a downward force is imparted to the basket 5 and an upward force is imparted to the tube 3. Such force will cause the split ring 21 to be cammed out of the groove 19 so as to be completely positioned in the groove 20, to permit sliding movement of the receptacle 5 to the position illustrated in Figure 3. An abutment 31 is provided on the tube 3 for limiting downward movement of the receptacle 5. As downward movement is imparted to the receptacle 5, it will be apparent that the position of the flange 9 with respect to the receptacle 5 will be relatively changed until the flange 9 will be completely positioned out of the receptacle 5. In such position, the coffee grounds above the flange 9 will be readily accessible and easily removed therefrom. After removal of the coffee grounds from the flange 9, it is merely necessary to slide the receptacle 5 upward to the position shown in Figures 1 and 2, and as such position is reached, the locking ring 21 will engage in the groove 19 to releasably hold the receptacle 5 in its normal operative position until such time as it is desired to again remove coffee grounds from the receptacle 5.

The locking ring 21 cooperating with the grooves 22 and 23 permits similar sliding movement of the sleeve 11 and flange 9 with respect to the tube 3 to allow the removal of the sleeve 11 and flange 9 from the tube 3.

To effect such removal, it is first necessary to turn the sleeve 11 to permit the pin 24 to move upwardly out of the locking slot 25. It is then merely necessary to grasp the projecting portion 12a and pull the sleeve 11 upwardly with respect to the tube 3. Such force will cause the ring 21 to be cammed outwardly from the groove 22 into the groove 23 to permit sliding movement and disengagement of the sleeve 11 with respect to the tube 3.

From the foregoing, it will be apparent that there is provided a simple and efficient means for effecting the removal of the coffee grounds from the receptacle 5. It will also be apparent that the grounds may be removed from the receptacle 5 by causing movement of the sleeve 11 and integral flange attached thereto relative to the receptacle 5 or by causing movement of the receptacle 5 relative to the flange resting on the bottom of the receptacle 5.

Since hot water in passing over the distributor plate 27 may produce an air lock within the basket 5 and disturb proper drainage of the basket, openings 31 are provided in the upper part of the side wall of the basket 5. The openings 31 also provide an overflow in the event that the filter 29 becomes clogged and prevents drainage through the bottom of the basket.

Having thus described my invention, what I claim as new and desire to secure by Letters Patent of the United States, is:

1. In a coffee percolator having a central percolator tube, a coffee receptacle mounted adjacent the upper end of said tube and forming an annular space about said tube for the reception of coffee grounds, a perforated annular flange surrounding said tube and covering the bottom of said receptacle, for supporting on the upper side of said flange the entire body of coffee grounds received in said receptacle, a plurality of members depending from said flange and engaging the bottom of said receptacle to space said flange therefrom and to permit drainage of liquid through the bottom of said receptacle, a sleeve formed integrally with the inner edge of said annular flange and releasably secured to the tube for sliding movement relative thereto upon release therefrom, and a handle member formed on the upper end of said sleeve at a point above the level of coffee grounds received in said receptacle and providing a manual grip for withdrawing said flange and coffee grounds from said receptacle.

2. A percolator as claimed in claim 1, in combination with an annular perforated filter element supported by the upper surface of said flange, the perforations in said filter element being of a size to permit passage of liquid therethrough while preventing entry of coffee grounds thereinto, said sleeve being further provided with a projecting portion providing a circular ledge against which the inner edge of said annular filter element may abut, the central opening in said filter element being of sufficient size to permit the passage of said handle member therethrough.

3. In a coffee percolator having a central percolator tube, a coffee receptacle mounted adjacent the upper end of said tube and forming an annular space about said tube for the reception of coffee grounds, an annular flange surrounding said tube and covering the bottom of said receptacle, means securing said flange to said tube, and means releasably securing said receptacle to said tube, said receptacle being slidably movable with respect to said tube on release of said releasable securing means to cause movement of said flange out of said receptacle to eject coffee grounds therefrom when said receptacle is moved relative to said tube.

4. In a coffee percolator having a central percolator tube, a coffee receptacle mounted adjacent the upper end of said tube and forming an annular space about said tube for the reception of coffee grounds, a perforated annular flange surrounding said tube and covering the bottom of said receptacle, a sleeve formed integrally with the inner edge of said annular flange, means preventing downward movement of said sleeve and flange relative to said tube, a sleeve integrally secured to the bottom of said receptacle and provided with a circumferential groove surrounding said tube, said tube being provided with a circumferential groove facing said first named groove when said receptacle is in a normal position with said flange adjacent the bottom of said receptacle, and means releasably securing said receptacle in said normal position comprising a split resilient ring lying partially in each of said grooves, said ring being movable completely into one of said grooves to release said receptacle for sliding movement away from said flange to eject coffee grounds from said receptacle.

5. In a coffee percolator having a central percolator tube, a coffee receptacle mounted adjacent the upper end of said tube and forming an annular space about said tube for the reception of coffee grounds, a perforated annular flange surrounding said tube and covering the bottom of said receptacle, a sleeve formed integrally with the inner edge of said annular flange and provided with a circumferential groove facing said tube, said tube being provided with a circumferential groove facing said first named groove, a split resilient ring normally lying partially in both of said grooves to hold said sleeve and flange in a fixed position and movable completely into one of said grooves to permit removal of said sleeve and flange from said tube, a sleeve integrally secured to the bottom of said receptacle and provided with a third circumferential groove facing said tube, said tube being provided with a second circumferential groove facing said third circumferential groove when said receptacle is in a normal position with said flange adjacent the bottom of said receptacle, and means releasably securing said receptacle to said tube comprising a split resilient ring lying partially in each of said two last mentioned grooves and movable completely into one of said second or third grooves to release said receptacle for sliding movement away from said flange to eject coffee grounds from said receptacle.

6. In a coffee percolator having a central percolator tube, a coffee receptacle mounted adjacent the upper end of said tube and forming an annular space about said tube for the reception of coffee grounds, and means for removing coffee grounds from said receptacle comprising a contractable and expansible member substantially covering the bottom of said receptacle and adjustable to different positions to fit various size receptacles, and a carrier member connected to said contractable and expansible member and extending upwardly to a position adjacent the top of said tube by which said adjustable member may be withdrawn from said receptacle to remove coffee grounds therefrom.

7. In a coffee percolator having a central percolator tube, a coffee receptacle mounted adjacent the upper end of said tube and forming an annular space about said tube for the reception of coffee grounds, and means for removing coffee grounds from said receptacle comprising a sleeve surrounding said tube, a plurality of resilient members secured to said sleeve and angularly inclined outwardly therefrom, lifting members secured to the bottom of said resilient members and adapted to occupy positions substantially covering the bottom of said receptable, said resilient members and lifting members being adjustable to different positions to fit within receptacles of various sizes.

8. In a coffee percolator having a central percolator tube, a coffee receptacle element mounted upon said tube and forming an annular space about said tube for the reception of coffee grounds, an ejector element normally occupying a position adjacent the bottom of said receptacle, and means releasably securing said elements to said tube, said elements being slidably movable with respect to said tube on release of their respective securing means to cause movement of said ejector out of said receptacle to eject coffee grounds therefrom when either of said elements is moved relative to the other and to the tube.

9. In a coffee maker, a liquid container, a coffee grounds receptacle mounted therein, an ejector element normally occupying a position adjacent the bottom of said receptacle, and means releasably securing said elements and said receptacle against relative movement, said element and said receptacle being relatively movable upon release of said securing means to cause movement of said flange out of said receptacle to eject coffee grounds therefrom.

10. In a coffee maker having a central percolator tube, a coffee receptacle element mounted upon said tube and forming an annular space about said tube for the reception of coffee grounds, an ejector element normally occupying a position adjacent the bottom of said receptacle, means for securing one of said elements to said tube, and means for releasably securing the other of said elements to said tube, said last means being operable to permit sliding movement of said other element relative to said one element and relative to said tube upon application of opposite forces to said element and to said tube whereby to cause movement of said ejector out of said receptacle to eject coffee grounds therefrom.

11. In a coffee maker, a coffee grounds receptacle having a central opening in the bottom thereof, a circular coffee ground supporting member normally occupying a position adjacent to bottom of said receptacle, and an element secured to said member and having a portion extending through said opening, said portion being engageable by the hand of a user to cause movement of said member relative to said receptacle for ejecting coffee grounds therefrom upon application of opposite forces to said receptacle and said element.

JOSEPH McMENAMIN.